United States Patent [19]

Yoshida et al.

[11] Patent Number: 5,043,304

[45] Date of Patent: Aug. 27, 1991

[54] METHOD OF PRODUCTION OF CUBIC BORON NITRIDE-CONTAINING HIGH-DENSITY INORGANIC COMPOSITE SINTERED ARTICLE

[75] Inventors: Haruo Yoshida, Nagoya; Shoichi Kume, Tsushima; Kazutaka Suzuki; Michihide Machida, both of Nagoya, all of Japan

[73] Assignees: Agency of Industrial Science & Technology; Ministry of International Trade & Industry, both of Tokyo, Japan

[21] Appl. No.: 436,624

[22] Filed: Nov. 15, 1989

[30] Foreign Application Priority Data

May 17, 1989 [JP] Japan ................. 1-125502

[51] Int. Cl.⁵ ............................. C04B 35/58
[52] U.S. Cl. ..................... 501/96; 501/102; 501/126; 501/127; 501/153; 501/154; 501/103; 264/65
[58] Field of Search ............. 501/96, 103, 127, 126, 501/153, 102, 154; 264/65

[56] References Cited

U.S. PATENT DOCUMENTS 4,587,225 5/1986 Tsukuma et al. ................. 501/127

FOREIGN PATENT DOCUMENTS 0104977 9/1980 Japan ................. 501/96
0060679 4/1983 Japan ................. 501/96

OTHER PUBLICATIONS

Journal of the Ceramic Society of Japan, 1981, pp. 45-49, T. Yamada et al., "Fabrication of Tin by Hot Isostatic Pressing".

Primary Examiner—William R. Dixon, Jr.
Assistant Examiner—C. Melissa Bonner
Attorney, Agent, or Firm—Oblon, Spivak, McClelland, Maier & Neustadt

[57] ABSTRACT

A cubic boron nitride-containing high-density inorganic composite sintered article is produced by a method which essentially consists of preparing a mixture of a cubic boron nitride powder with an inorganic compound powder capable of forming a high-rigidity sintered article under the conditions permitting the cubic boron nitride to remain in a substantially metastable, though not thermodynamically stable, state, a mixture of an inorganic compound-coated cubic boron nitride powder with an inorganic compound powder, or an inorganic compound-coated cubic boron nitride powder, and sintering the mixture of the cubic boron nitride powder with an inorganic compound powder, the mixture of the inorganic compound-coated cubic boron nitride powder with an inorganic compound powder or an inorganic compound-coated cubic boron nitrides powder, under the conditions of not more than 2,000 MPa of pressure and not more than 1,500° C. of temperature for permitting the cubic boron nitride to remain in a substantially metastable, though not thermodynamically stable, state for a period incapable of causing conversion of the cBN into a graphite-type phase.

21 Claims, 1 Drawing Sheet

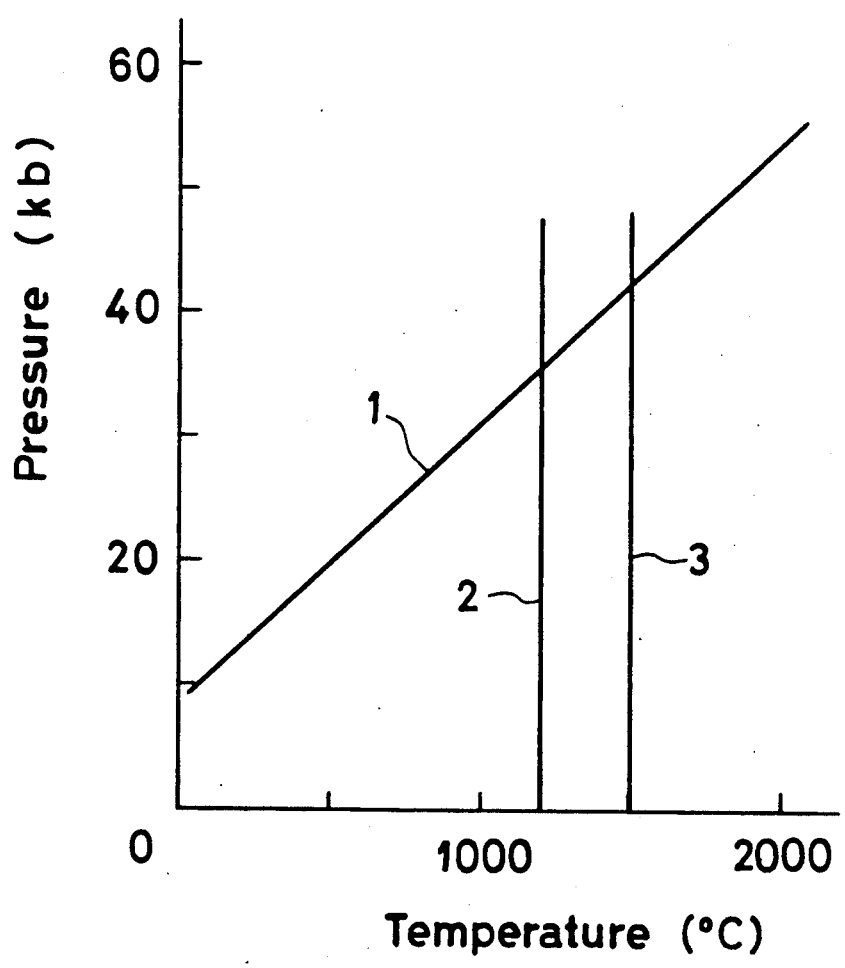

METHOD OF PRODUCTION OF CUBIC BORON NITRIDE-CONTAINING HIGH-DENSITY INORGANIC COMPOSITE SINTERED ARTICLE

BACKGROUND OF THE INVENTION

1. Field of the Invention

This invention relates to a method for the production of a cubic boron nitride-containing high-density inorganic composite sintered article possessing a compact texture and a high hardness. The sintered articles produced by the method of this invention are used as high-rigidity wearproof materials such as, for example, cutting tools and wire drawing dies.

2. Prior Art Statement

Heretofore, cubic boron nitride-containing ceramic sintered articles have been produced by the following method.

Specifically, this production is effected by mixing cubic boron nitride with an inorganic substance and keeping the resultant mixture under an extremely high pressure at an elevated temperature such that the cubic boron nitride will not undergo conversion into a graphite-type phase (hexagonal boron nitride; hBN) and will retain thermodynamic stability sufficient for the sintered article to acquire a compact texture.

The drawing is a phase diagram of boron nitride. In the graph, the area overlying the line 1 represents the thermodynamically stable region for cubic boron nitride and the area underlying the line 1 that for graphite-type boron nitride.

The cubic boron nitride as disclosed in Japanese Patent Public Disclosure SHO 63(1988)-35456, for example, is sintered under a pressure of at least 40 kb at a temperature of at least 1,200° C. These sintering conditions are very harsh and cannot be attained unless a girdle type or belt type ultra-high pressure device is used.

For this reason, the cubic boron nitride-containing high-density composite sintered article (hereinafter referred to as "cBN sintered article") is not amenable to easy mass production, entails a high cost of production, and is incapable of being produced in large size.

Wakatsuki et al. conducted an experiment on cubic boron nitride under an ultra-high pressure. They reported that when the cubic boron nitride (hereinafter referred to as "cBN") is in a substantially metastable state though not in a thermodynamically stable state, it remains virtually stably because the time which the cBN requires for being converted into the graphite-type phase state is extremely long and that the highest temperature permitting the retention of this substantially stable state falls on the line 2 shown in the drawing [Wakatsuki, Ichise, Aoki and Maeda: "Program and Abstracts of the 14th High Pressure Conference of Japan", (1972) page 78]. Their observation indicates that even under the conditions of a low pressure and a high temperature falling in the area underlying the thermodynamic equilibrium line 1 of cBN shown in the drawing, the cubic boron nitride exists virtually stably so long as the temperature does not surpass the line 2, for example, is not higher than 1,200° C.

The aforementioned report by Wakatsuki et al. is based on an experiment conducted on cBN only by the use of an ultra-high pressure device. This experiment has demonstrated that the cBN continues to exist without being converted into a graphite-type phase even when it is treated in its virtually metastable state though not in its thermodynamically stable state.

It has been found that the treatment of the kind performed by Wakatsuki et al. does not necessarily require use of the so-called ultra-high pressure device.

In the production of the cBN sintered article with the inorganic compound and the cBN, therefore, application of a pressure effective in promoting the compaction of the inorganic compound enables production of a sintered article having a highly compacted texture.

An object of this invention is to provide a method for the production of a high-rigidity compact cBN sintered article in a substantially metastable, though not thermodynamically stable, region of cBN.

SUMMARY OF THE INVENTION

To accomplish the object described above according to this invention, there is provided a method for the production of a cubic boron nitride-containing high-density inorganic composite sintered article, essentially consisting of preparing (A) a mixture of (a) 1% to 70% by volume of a cubic boron nitride powder with (b) 99% to 30% by volume of an inorganic compound a') capable of forming a high-rigidity sintered article possessing a density of at least 85% and a Vickers hardness of at least 800 and b') incapable of promoting the conversion of the cubic boron nitride into a graphite-type phase under the conditions of not more than 2,000 MPa of pressure and not more than 1,500° C. of temperature for permitting the cubic boron nitride to remain in a substantially metastable, though not thermodynamically stable, state or a shaped article obtained, when necessary, by compressing the mixture in a mold of a prescribed shape or (B) cubic boron nitride particles coated with 1% to 300% by volume, based on the amount of the cubic boron nitride, of an inorganic compound a') capable of forming a high-rigidity sintered article possessing a density of at least 85% and a Vickers hardness of at least 800 and b') incapable of promoting the conversion of the cubic boron nitride into a graphite-type phase under the conditions of not more than 2,000 MPa of pressure and not more than 1,500° C. of temperature for permitting the cubic boron nitride to remain in a substantially metastable, though not thermodynamically stable, state or a shaped article obtained, when necessary, by compressing the composite in a mold of a prescribed shape, and firing the mixture or shaped article (A) or the particles or shaped article of (B) under the conditions of not more than 2,000 MPa of pressure and not more than 1,500° C. of temperature for permitting the cubic boron nitride to remain in a substantially metastable, though not thermodynamically stable, state for a period in the range in which the cBN undergoes no conversion into a graphite-type phase.

The case in which the cBN in the form of (A) mentioned above is further coated with the inorganic substance is embraced by the present invention.

BRIEF DESCRIPTION OF THE DRAWING

The drawing is a phase diagram of boron nitride.

DETAILED DESCRIPTION OF THE PREFERRED EMBODIMENTS

As devices used advantageously in working the method described above, a hot isostatic press (HIP) device and a hot press (HP) device may be cited.

The hot isostatic pressure is a device for sintering a given object at an elevated temperature under isotropic application of pressure, with an inert gas for example serving as a pressure transmitting medium.

In this case, the mixture of the cBN with the inorganic compound to be subjected to the simultaneous application of heat and pressure is placed in a capsule capable of transmitting the HIP pressure and the capsule, hermetically sealed after displacement of the entrapped air, is disposed within the HIP.

The hot press is a device for sintering a given object packed therein at an elevated temperature under uniaxial application of pressure.

Now, the cBN to be used in the present invention will be described in detail below.

The cBN powder is a synthetic product.

When the cBN is a product of synthesis using a catalyst, the catalyst must be removed from the product of synthesis to prevent the conversion of the cBN into a graphite-type phase. The particle size of the cBN has only to be such as to fit the use for which the sintered product is intended.

The inorganic compound which is mixed with the cBN for forming the cBN sintered article is such that when it is sintered by itself in an HIP device or an HP device, for example, under the conditions of not more than 2,000 MPa of pressure and not more than 1,500° C. of temperature, preferably the conditions falling in the region permitting the cBN to remain in a substantially metastable state, it will produce a compact high-rigidity sintered article exhibiting a density of not less than 85% and a Vickers hardness of not less than 800. Further, this inorganic compound must be incapable of promoting the conversion of the cBN into a graphite-type phase. As the inorganic compound fulfilling this requirement, there is used at least one member selected from the class consisting of (i) oxides, nitrides, carbides, carbonitrides and oxynitrides of (a) metals of Groups 4a (Ti, Zr, Hf), 5a, (V, Nb, Ta) and 6a (Cr, Mo, W) in the Periodic Table of Elements, (b) Si, (c) B and (d) Al; (ii) titanium nitride; and (iii) titania.

Particularly, alumina, an oxide of aluminum, can form a finely divided raw material exhibiting high purity and a good sintering property. For example, the alumina which is produced by the ammonium-aluminum carbonate thermal decomposition process as disclosed in Japanese Patent Public Disclosure SHO 63(1988)-151616 is preferable because it forms a compact texture at a temperature on the order of 1,400° C. under ordinary sintering conditions of normal pressure. Further, in the case of the finely divided alumina powder of high purity having mixed therewith up to 10% by volume of magnesia (MgO) and/or titania (TiO$_x$, $x=1\sim2$) which is effective in promoting the sintering of alumina, high-purity alumina other than the alumina disclosed in Japanese Patent Public Disclosure SHO 63(1988)-151616 mentioned above, e.g. a high-purity readily sintering alumina produced by the Bayer process, the organic aluminum hydrolyzing decomposition process, the ammonium-alum thermal decomposition process, the ethylene chlorohydrin process, or the submerged sparkle discharging process, composed of minute particles not exceeding 1 μm, and possessed of a purity of not less than 99% may be used.

Otherwise, the oxide of zirconium, preferably the readily sintering yttria-added partially stabilized zirconia (2~4 mol % Y$_2$O$_3$-ZrO$_2$) powder produced by the coprecipitation process or the alumina-zirconia type powder (FC Report 1 [5] (1983) 13-17) and the titania powder (TiO$_2$: Program and Abstracts of the 15th High Pressure Conference of Japan, (1973) page 174) may be used.

As a nitride of titanium, the titan nitride (TiN: Yamada et al., Journal of the Ceramic Society of Japan, 89, (1981) 621-625) may be used.

For the purpose of enhancing the sintering property of the mixture of the cBN with the inorganic compound, the surface of the cBN may be coated with 0.1% to 50% by volume, based on the amount of cBN, of at least one member selected from the class consisting of metals of Groups 4a, 5a and 6a in the Periodic Table of Elements, Si, B and Al oxides, nitrides, carbides, carbonitrides, and oxynitrides of the metals of Groups 4a (Ti, Zr, Hf), 5a (V, Nb, Ta) and 6a (Cr, Mo, W) in the Periodic Table of Elements, and Si, B and Al by the PVD process, the CVD process, or the plating process, or the disproportionation reaction process.

The conditions for permitting the cBN to remain in a substantially metastable, though not thermodynamically stable, state are those underlying the line 1 in the graph of the drawing and not exceeding 1,500° C. In other words, the cBN remains substantially stably up to 1,500° C. (line 3 in the same graph), a temperature much higher than the temperature 1,200° C. reported by Wakatsuki et al. When the temperature exceeds 1,500° C., however, the cBN is rapidly converted to a graphite-type phase. The expression "metastable region of cBN" as used in the present invention refers to the region of low pressure and low temperature enclosed by the line 1 and the line 3 in the graph of the drawing.

The upper limit of the sintering temperature, therefore, is 1,500° C. When the sintering temperature is set in the neighborhood of 1,500° C., it becomes necessary to control the sintering temperature rigidly. Preferably, the pressure is in the range of 1 MPa to 1,000 MPa, which can be generated by the existing HIP, and the temperature is in the range of 500° C. to 1,400° C.

The present invention also embraces the cBN particles coated with 1% to 300% by volume. based on the amount of cBN particles, of the inorganic compound and the method for sintering the coated cBN under entirely the same conditions as described above.

When the sintering is effected by the use of a HIP device, it is advantageously carried out by the capsule process which requires the mixture to be disposed in a capsule capable of transmitting the HIP pressure and then requires the capsule to be hermetically sealed after displacement of the entrapped air. The capsule is desired to be such that it will be suitably softened at the sintering temperature and will effectively transmit the HIP pressure. The materials which are usable for the capsule fulfilling this requirement include such glass materials as Pyrex and Vycor and such metallic materials as Pt, Mo, Fe, Fe alloys, Ni and Ni alloys, for example.

Since the capsule made of such a material as mentioned above reacts with the cBN or the inorganic compound, generally hexagonal boron nitride (hBN) powder is interposed between them for the purpose of precluding this reaction.

This invention practically concerns production of the cBN sintered article by the use of a HIP device or a HP device. It has originated in the inventors' new knowledge that the upper limit of the sintering temperature is 1,500° C., that the effective use of the inorganic compound within the range of working temperature is attained under specific conditions of temperature and pressure, and that this sintering is attained sufficiently in a substantially metastable state without requiring application of the pressure which is otherwise required when the cBN assumes a thermodynamically stable state.

This invention permits the cBN-containing high-density inorganic composite sintered article which has heretofore been produced by a treatment in the thermodynamically stable region of cBN, i.e. under the conditions of extremely high pressure and high temperature to be obtained by a treatment to be carried out under moderate conditions sufficient for retention of the cBN in a substantially metastable, though not thermodynamically stable, state.

Now, the method of this invention for the production of a cubic boron nitride-containing high-density inorganic composite sintered article will be described below with reference to working examples.

EXAMPLE 1

With a ball mill made of alumina, a synthetic cBN powder having a particle diameter of not more than 1 $\mu$m and a high-purity (99.99%) readily sintering alumina powder having an average diameter of 0.2 $\mu$m and produced by the ammonium-aluminum carbonate thermal decomposition process were mixed in a ratio of 10:90 by volume in acetone for two hours. Thereafter, the resultant mixture was dried in a vacuum of $10^{-6}$ torr at 200° C.

Then, the dried powder was compressed in the shape of a disk 16 mm in diameter and 5 mm in thickness. The shaped article was disposed in a capsule of Pyrex glass filled with an hBN powder and the capsule was under $10^{-6}$ torr at 400° C. for 12 hours and then hermetically sealed.

The capsule was disposed in a HIP device using argon gas as a pressure transmitting medium and sintered therein at a temperature of 1,200° C. under a pressure of 150 MPa for a period of 0.5 hour.

Thereafter, the device was cooled and relieved of pressure and the sintered article was removed from the device.

The sintered article had a density of 96.8% and a Vickers microhardness of 2,680 under a load of 500 g after 10 seconds' testing time. The mixing ratio of raw materials, the sintering conditions, and the physical properties of the sintered article were as shown in Table 1.

EXAMPLES 2 TO 8

Sintered articles were produced by following the procedure of Example 1, except that the ratio of the cBN powder to the alumina powder in volume was varied as shown in Table 1. They were tested for physical properties. The conditions and the results of the test were as shown in Table 1.

EXAMPLES 9 TO 10

Sintered articles were produced by following the procedure of Example 1, except that high-purity (not less than 99%) readily sintering alumina powder produced by the Bayér process in the form of minute particles having a diameter of not more than 1 $\mu$m and incorporating therein MgO, TiO$_x$ (x=1~2) as a sintering auxiliary were used as inorganic compounds. The conditions of production and the results of test for physical properties were as shown in Table 1.

TABLE 1

| Example | Mixing ratio ||||| HIP sintering conditions ||| Sintered article ||
|---|---|---|---|---|---|---|---|---|---|---|
| | cBN vol % | Alumina 1 vol % | Alumina 2 vol % | MgO vol % | TiO$_x$ vol % | Pressure MPa | Temperature (°C.) | Time hr | Relative density (%) | Hardness Hv |
| 1 | 10 | 90 | — | — | — | 150 | 1200 | 0.5 | 96.8 | 2680 |
| 2 | 10 | 90 | — | — | — | 150 | 1200 | 3.0 | 98.4 | 2700 |
| 3 | 30 | 70 | — | — | — | 150 | 1200 | 3.0 | 94.8 | 2950 |
| 4 | 50 | 50 | — | — | — | 150 | 1200 | 3.0 | 85.1 | 2200 |
| 5 | 30 | 70 | — | — | — | 150 | 1300 | 3.0 | 96.1 | 2980 |
| 6 | 30 | 70 | — | — | — | 150 | 1400 | 3.0 | 97.1 | 3070 |
| 7 | 30 | 70 | — | — | — | 150 | 1500 | 0.5 | 95.1 | 1530 |
| 8 | 10 | — | 87.3 | 1.1 | 1.6 | 150 | 1200 | 0.5 | 98.3 | 2680 |
| 9 | 30 | — | 67.3 | 1.1 | 1.6 | 150 | 1200 | 0.5 | 95.1 | 2800 |

Alumina 1: produced by the ammonium-aluminum carbonate thermal decomposition process
Alumina 2: produced by the Bayer process The sintered articles produced in Examples 1 to 9 possessed high degrees of density and extremely high levels of Vickers microhardness.

The powder X-ray diffraction patterns obtained of the sintered articles of Examples 1 to 6 and Examples 8 and 9 to determine the crystal phases of the articles showed no discernible diffraction peak other than the peaks of cBN and alumina.

The powder X-ray diffraction pattern obtained of the sintered article of Example 7 which used a sintering temperature of 1,500° C. and a sintering time of 0.5 hour showed a peak indicative of the presence of a small amount of graphite-type phase in addition to the peaks of cBN and alumina. This fact indicates that the sintering carried out at the temperature for the period both mentioned above allowed part of cBN to be converted into a graphite-type phase. Thus, the sintering temperature 1,500° C. is logically judged to be the upper limit of the HIP sintering temperature in this invention.

COMPARATIVE EXPERIMENT 1

A sintered article was produced by following the procedure of Example 1, except that the mixing ratio of cBN to alumina in volume was changed at 90:10 and the sintering was performed under a pressure of 150 MPa at a temperature of 1,200° C. The sintered article had a density of 65.6% and a hardness of 500. It was confirmed that the sintering under these conditions failed to produce a sintered article possessing sufficient density and hardness.

COMPARATIVE EXPERIMENT 2

A sintered article was obtained by following the procedure of Example 1, except that the mixing ratio of cBN to alumina in volume was changed to 70.5:29.5. The sintered article had a density of 70.9% and a hardness of 950. It was confirmed that the sintering under these conditions failed to produce a sintered article possessing sufficient density and hardness.

EXAMPLES 10 TO 19

Sintered articles were produced by substantially following the procedure of Example 1, except that a readily sintering yttria-added partially stabilized zirconia (3 mol % $Y_2O_3$-$ZrO_2$) (hereinafter referred to as "PSZ") powder produced by the coprecipitation process was used in the place of alumina and the volume ratio of cBN to PSZ and the sintering conditions of HIP were varied widely.

The mixing ratios of cBN to PSZ, the sintering conditions of HIP, and the physical properties of the produced sintered articles were as shown in Table 2.

TABLE 2

| | Mixing ratio | | HIP sintering conditions | | | Sintered article | |
|---|---|---|---|---|---|---|---|
| Example | cBN vol % | PSZ vol % | Pressure MPa | Temperature (°C.) | Time hr | Relative density (%) | Hardness Hv |
| 10 | 10 | 90 | 150 | 1200 | 0.5 | 99.0 | 1520 |
| 11 | 30 | 70 | 150 | 1200 | 0.5 | 98.2 | 1860 |
| 12 | 50 | 50 | 150 | 1200 | 0.5 | 88.3 | 980 |
| 13 | 10 | 90 | 150 | 1200 | 3.0 | 99.3 | 1530 |
| 14 | 30 | 70 | 150 | 1200 | 3.0 | 98.5 | 1880 |
| 15 | 50 | 50 | 150 | 1200 | 3.0 | 96.1 | 2010 |
| 16 | 70 | 30 | 150 | 1200 | 6.0 | 85.2 | 1100 |
| 17 | 30 | 70 | 150 | 1300 | 3.0 | 98.9 | 1900 |
| 18 | 30 | 70 | 150 | 1400 | 3.0 | 99.1 | 1940 |
| 19 | 30 | 70 | 150 | 1500 | 0.5 | 99.2 | 1300 |

From Table 2, it is clearly noted that the sintered articles listed therein had very compact textures and high levels of hardness.

COMPARATIVE EXPERIMENT 3

A sintered article was produced by following the procedure of Example 10, except that the volume ratio of cBN to PSZ was changed to 70.5:29.5 and the sintering was carried out under a pressure of 150 MPa at a temperature of 1,200° C. for 0.5 hour. The sintered article had a density of 73.7% and a hardness of 420. It was confirmed that the sintering under these conditions failed to produce a sintered article possessing sufficient density and hardness.

COMPARATIVE EXPERIMENT 4

A sintered article was produced by faithfully following the procedure of Comparative Experiment 3, except that the volume ratio of cBN to PSZ was changed to 90:10. The sintered article had a density of 66.8% and a hardness of 300. It was confirmed that the sintering under these conditions failed to produce a sintered article possessing sufficient density and hardness.

EXAMPLE 20

A cBN powder having a maximum particle diameter of 2 μm was coated with alumina in a volume ratio of 35:65 (i.e. coated with about 200% by volume, based on the amount of the cBN) by the PVD process (ion sputtering process). Then, the coated cBN powder was further coated by the PVD process with 1% by weight and 2% by weight of $Al_2O_3$ coated sequentially with MgO and $TiO_x$ (x=1~2) respectively.

Then, the powder thus obtained was compressed in the shape of a disk 16 mm in diameter and 5 mm in thickness. This shaped article was disposed in a capsule of Pyrex glass filled with an hBN powder and the capsule was evacuated and hermetically sealed under a pressure of $10^{-6}$ torr at 400° C. for 12 hours.

The capsule was disposed in a HIP device using argon gas as a pressure transmitting medium and sintered therein under a pressure of 150 MPa at a temperature of 1,200° C. for 3 hours. The capsule was cooled and then relieved of pressure and the sintered article was removed from the capsule. The sintered article had a density of 96% and a Vickers hardness of 3110.

EXAMPLE 21

A sintered article was obtained by following the procedure of Example 1, except that a cBN powder having a maximum particle diameter of 2 μm was coated with 5% by volume, based on the amount of cBN, of TiO by the PVD process, the coated cBN powder was mixed with PSZ powder in a volume ratio of 60:40, and the resultant mixture was sintered under a pressure of 150 MPa at a temperature of 1,200° C. for 3 hours. The sintered article had a density of 99% and a hardness of 2100.

What is claimed is:

1. A method for the production of a cubic boron nitride-containing high-density inorganic composite sintered article, consists essentially of (A) preparing a mixture of (a) 1% to 70% by volume of a cubic boron nitride powder with (b) 99% to 30% by volume of an inorganic compound a') capable of forming a high-rigidity sintered article possessing a density of at least 85% and a Vickers hardness of at least 800 and b') incapable of promoting the conversion of said cubic boron nitride into a graphite-type phase (hBN) under the conditions of not more than 2,000 MPa of pressure and not more than 1,500° C. of temperature for permitting said cubic boron nitride to remain in a substantially metastable, though not thermodynamically stable, state (B) compressing said mixture in a mold of a prescribed shape and (C) sintering the shaped article of step B under the conditions of not more than 1,000 MPa of pressure and not more than 1,500° C. of temperature for permitting said cubic boron nitride to remain in a substantially metastable, though not thermodynamically stable, state for a period in the range in which said cBN undergoes no conversion into a graphite-type phase.

2. A method according to claim 1, wherein the region permitting said cubic boron nitride to remain in a substantially metastable, though not thermodynamically stable, state has a pressure in the range of 1 MPa to 1,000 MPa and a temperature in the range of 500° C. to 1,400° C.

3. A method according to claim 1, wherein the sintering method is chosen from the group consisting of hot isostatic pressing and hot pressing.

4. A method according to claim 1, wherein said inorganic compound is at least one member selected from the class consisting of oxides, nitrides, carbides, carbonitrides and oxynitrides of (a) Ti, Zr, Hf, V, Nb, Ta, Cr, Mo, and W, (b) Si (c) B and (d) Al.

5. A method according to claim 4, wherein said inorganic compound inorganic compound powder is alumina powder.

6. A method according to claim 5, wherein said alumina powder contains not more than 10% by weight of at least one member selected from the group consisting of $MgO_2$ and $TiO_x$ (wherein $x=1 \sim 2$).

7. A method according to claim 5, wherein the primary particles of said alumina powder have a maximum diameter of 1 μm.

8. A method according to claim 1, wherein said inorganic compound powder is zirconia powder.

9. A method according to claim 8, wherein said zirconia powder is a partially stabilized zirconia powder.

10. A method according to claim 8, wherein said zirconia powder is produced by the coprecipitation process and the primary particles thereof have a maximum diameter of 1 μm.

11. A method according to claim 1, wherein said cBN particles are coated with 0.1% to 50% by particle volume, based on the amount of said powder, of at least one member selected from the class consisting of (i) Si, B and Al; (ii) oxides, nitrides, carbides, carbonitrides and oxynitrides of (a) Ti, Zr, Hf, V, Nb, Ta, Cr, Mo, and W, (b) Si, (c) B and (d) Al; (iii) titanium nitride; and (iv) titania.

12. A method for the production of (A) a cubic boron nitride-containing high-density inorganic composite sintered article, consists essentially of preparing cubic boron nitride particles coated with 1% to 300% by volume, based on said cubic boron nitride, of an inorganic compound a') capable of forming a high-rigidity sintered article possessing density of at least 85% and a Vickers hardness of at least 800 and b') incapable of promoting the conversion of said cubic boron nitride into a graphite-type phase (hBN) under the conditions of not more than 2,000 MPa of pressure and not more that 1,500° C. of temperature for permitting said cubic boron nitride to remain in a substantially metastable, though not thermodynamically stable, state (B) compressing said particles in a mold of a prescribed shape and (C) sintering the shaped article of step B under the conditions of not more than 2,000 MPa of pressure and not more than 1500° C. of temperature for permitting said cubic boron nitride to remain in a substantially metastable, though not thermodynamically stable, state for a period in the range in which said cBN undergoes no conversion into a graphite-type phase.

13. A method according to claim 12, wherein the region permitting said cubic boron nitride remains in a substantially metastable, though not thermodynamically stable, state has a pressure in the range of 1 MPa to 1,000 MPa and a temperature in the range of 500° C. to 1,400° C.

14. A method according to claim 12, wherein the sintering method is chosen from the group consisting of hot isostatic pressing and hot pressing.

15. A method according to claim 12, wherein said inorganic compound is at least one member selected from the class consisting of oxides, nitrides, carbides, carbonitrides and oxynitrides of (a) Ti, Zr, Hf, V, Nb, Ta, Cr, Mo, and W, (b) Si, (c) B (d) Al.

16. A method according to claim 12, wherein said inorganic compound is alumina.

17. A method according to claim 16, wherein said alumina contains not more than 10% by weight of at least one member selected from the group consisting of MgO and $TiO_x$ (wherein $x=1 \sim 2$).

18. A method according to claim 12, wherein said inorganic compound is zirconia.

19. A method according to claim 18, wherein said inorganic compound contains a high-temperature phase stabilizing agent.

20. A method according to claim 19, wherein said high temperature phase stabilizing agent is at least one member selected from the group consisting of $Y_2O_3$, CaO, and MgO.

21. A method according to claim 1, wherein said cubic boron nitride particles are coated with 0.1% to 50% by particle volume, based on the amount of said powder, with zirconia.

* * * * *